United States Patent [19]
Weigele et al.

[11] 3,819,991
[45] June 25, 1974

[54] CONTROL DEVICE FOR A POSITION SELECTIVE MOTOR-DRIVEN WORK BRUSH

[76] Inventors: Gebhard Weigele, Bussardweg 2, 8900 Augsburg; Johann Sulzberger, Mozartstrabe 17, 8901 Steppach, Germany

[22] Filed: Aug. 29, 1972

[21] Appl. No.: 284,679

[52] U.S. Cl. .................... 318/39, 318/432, 15/21 E
[51] Int. Cl. ................................................ B60s 3/06
[58] Field of Search .......... 318/51, 52, 39, 98, 432, 318/433, 566, 646; 15/21 D, 21 E, DIG. 2

[56] References Cited
UNITED STATES PATENTS

| | | | |
|---|---|---|---|
| 3,425,080 | 2/1969 | Dolitzsch et al. | 15/21 E |
| 3,593,358 | 7/1971 | Hofmann | 15/21 D |
| 3,662,418 | 5/1972 | Kamiya | 15/21 E |
| 3,688,329 | 9/1972 | Capra | 15/21 E |

Primary Examiner—B. Dobeck
Assistant Examiner—W. E. Duncanson, Jr.
Attorney, Agent, or Firm—Woodhams, Blanchard and Flynn

[57] ABSTRACT

Control device for selecting the operating position of a work brush. In a brush which is movable to follow irregularities in the surface of a workpiece, such as the washing brush in an automotive wash station, means are provided for measuring the power demand by said brush and utilizing signals resulting therefrom to move the brush in a manner as to maintain the contact pressure substantially constant. In the preferred embodiment such means comprise a power meter measuring the power demand of the motor driving the brush and signals for correcting the position of the brush are emitted when said brush tends to fall below or move above predetermined limits.

2 Claims, 4 Drawing Figures

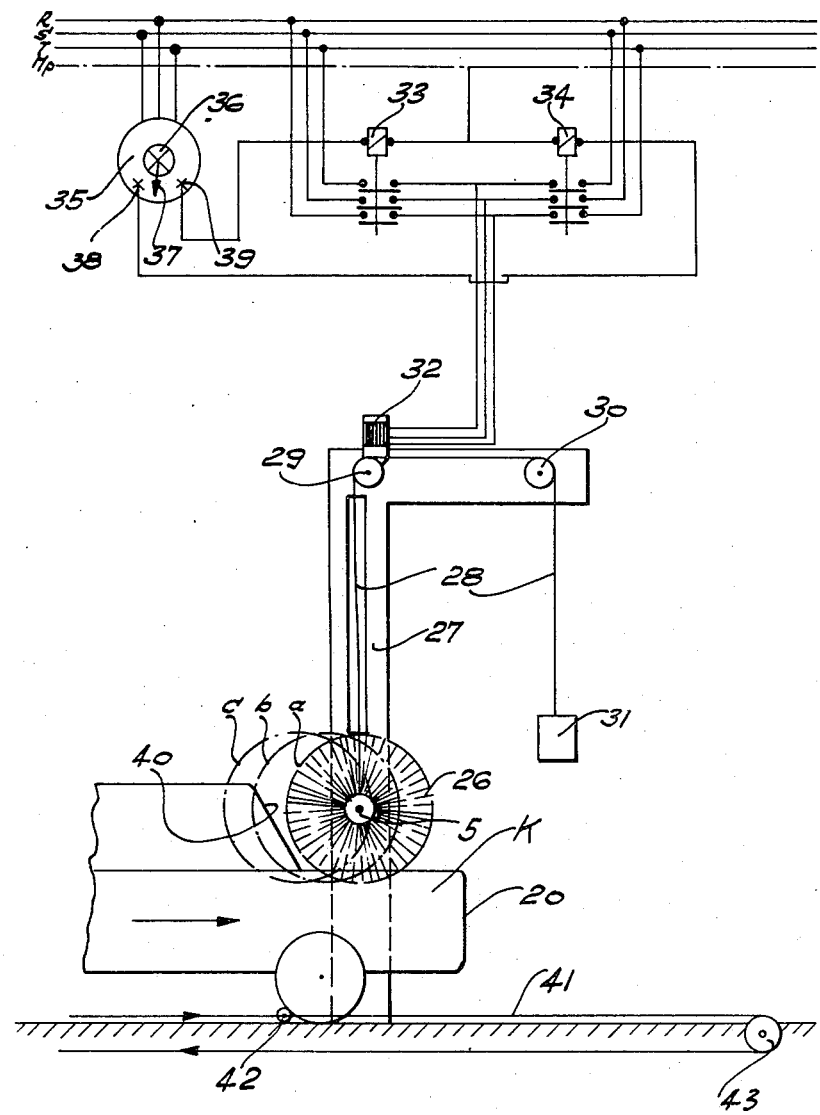

CONTROL DEVICE FOR A POSITION SELECTIVE MOTOR-DRIVEN WORK BRUSH

The invention relates to a control device for a motor-driven work brush which is moved by a positioning member, particularly a washing brush used for cleaning of motor vehicles. Said control device controls the relative movement between the brush and the surfaces which must be worked, which relative movement is required to achieve a certain contact pressure.

The basic purpose of the invention is to produce a simple and reliably operating control device of this type which during all washing operations assures an optimum, almost constant, brush contact pressure and thereby effects a highly effective washing of the vehicle without damaging either the vehicle or the washing device.

The invention commences in the thought that the contact pressure of the rotating washing brushes is proportional to the power requirements of the brush. Thus the invention consists in connecting a power meter to the brush drive motor, which power meter transmits control signals to the adjusting member upon exceeding, or upon falling below, a certain motor demand.

Since work brushes, particularly for cleaning of motor vehicles, are as a rule driven by electric motors, for the new control device an electric power meter is provided. If the motors are driven by alternating current, a power meter for this control device is provided which has the advantage that it misses the actual, instantaneous demand of the drive motor of the brush and accordingly current and voltage variations have no effect on the control of the brush.

The invention is discussed hereinafter in connection with exemplary embodiments illustrated in the drawings, in which:

FIG. 4 is the side view in a schematic illustration of a washing device with a horizontal brush for through-passing motor vehicles and showing also a schematic circuit for a control device.

Figure 1:
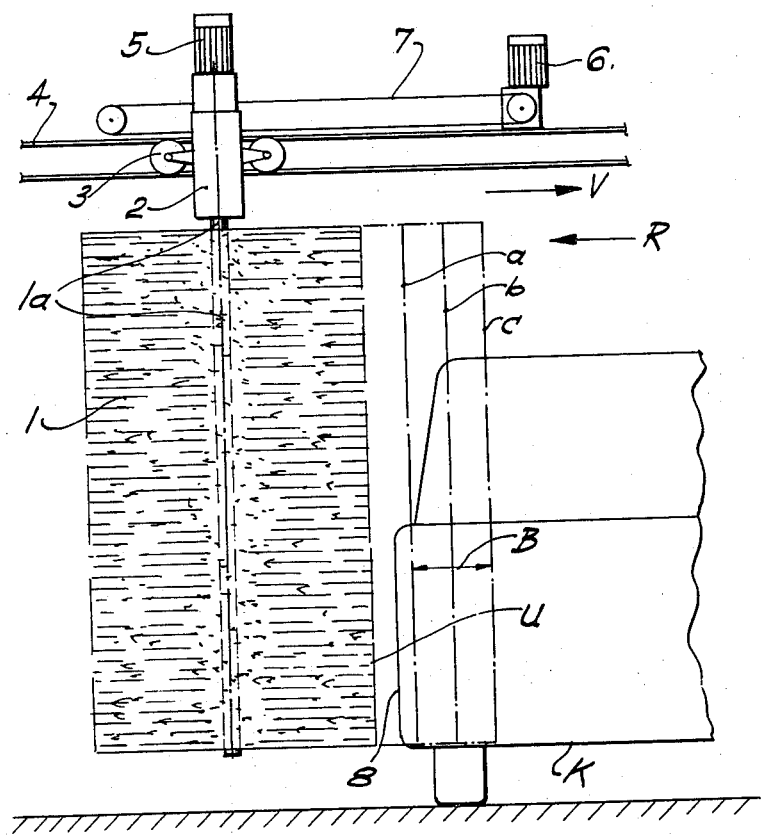
FIG. 1 is a front view of the control of a vertical washing brush during cleaning of one side of a motor vehicle.

FIG. 1 illustrates the washing of the longitudinal side 8 of a motor vehicle K with a vertical brush 1, the shaft 1a of which is supported in a housing 2 and is driven by an electric motor 5. The housing 2 forms with rollers 3 a carriage which is guided in a horizontal rail 4. This carriage is connected to an endless tension member 7 which can be driven by a servomotor 6 so that the rotating brush 1 can be guided in the direction V toward the sidewall 8 (at the start of the operative cycle) and also in direction R away therefrom (at the end of the operative cycle). The peripheral portion of the brush facing the vehicle is identified with the letter U. In the illustrated position of the brush 1 same runs idle. If by means of the servomotor 6, the brush with the peripheral portion U in contact with the sidewall of the vehicle is moved into the position indicated at a, the power demand of the brush drive motor 5 is increased to a certain value which hereinafter is identified as minimum demand. The power meter (which is not illustrated in FIG. 1 but is exemplarily illustrated in FIG. 4) transmits upon exceeding this minimum demand transmits a control signal to the servomotor 6 which causes further engagement by the brush up to an optimum contact pressure which occurs at a position is indicated at b. If, however, the rotating brush 1 comes too close to the vehicle K and thus the contact pressure is increased (for example by laterally projecting parts, like the fenders or the like), then the demand of the drive motor 5 is further increased. If by this the brush 1 exceeds in the direction V the position indicated at c, namely a minimum pressure, the power meter transmits upon exceeding the corresponding maximum demand of the motor 5 a control signal to the servomotor 6 which then moves back the brush in direction R until it reaches the optimum position b or turns same off.

If, however, the brush for some reason, moves in the direction R beyond the position a then the minimum contact pressure, and thereby also the minimum brush drive power demand, are exceeded so that then the output meter transmits a control signal to the servomotor 6 which again causes the starting movement of the brush in direction V.

This new control device thus assures a starting and stopping motion of the rotating brush 1 only in the zone B so that in this manner an almost contact pressure of the brush is achieved.

Figure 2:
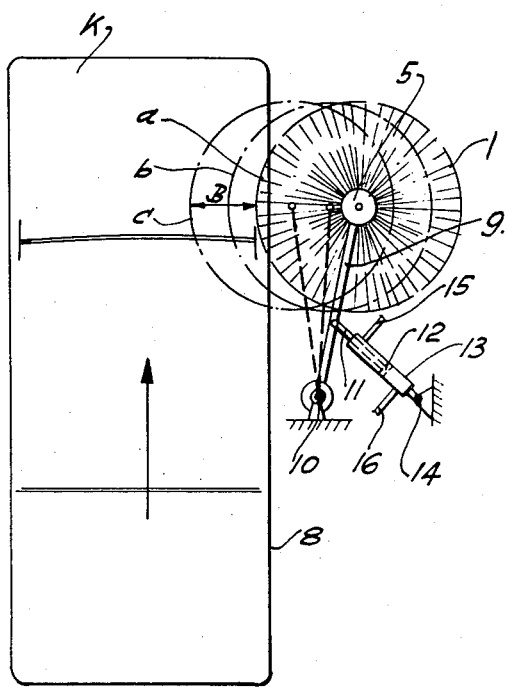
FIG. 2 is a top view of a different embodiment of a vertical brush during washing of a longitudinal side of a motor vehicle.

In the embodiment according to FIG. 2, the vertical brush 1 is supported pivotably on a pivot arm 9 about a vertical, stationary axis 10. The starting and stopping motion of the brush against the sidewall 8 of a motor vehicle K which is moved in the direction of the arrow is here accomplished by means of a pneumatic or hydraulic adjusting member. This adjusting member consists of a cylinder 13 which is supported pivotably about a stationary axis 14, in which cylinder a double-acting piston 12 with piston rod 11 slides which is hingedly connected to the pivot arm 9. A not illustrated electric power meter is provided which is connected to the brush drive motor 5 and which transmits control signals to the adjusting member, by for example closing or opening the conduits 15 and 16 which are connected to the cylinder 13 by electromagnetic valves. The control takes place in the afore-described manner. The brush moves here too in the zone B through the positions a, b and c.

Figure 3:
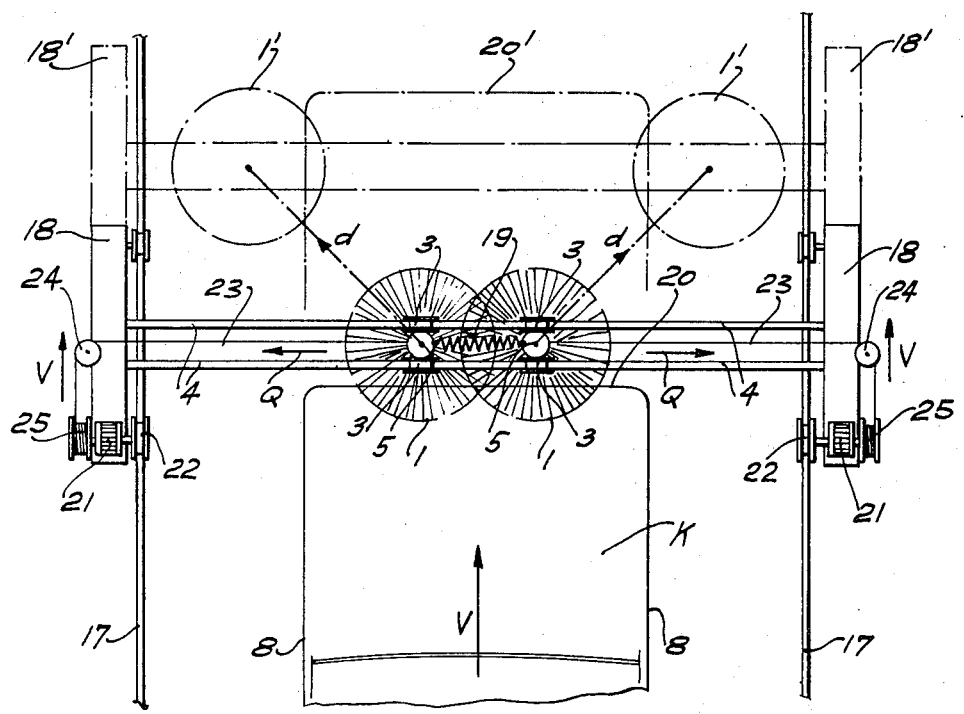
FIG. 3 is a top view of a washing device for through-passing motor vehicles.

In the embodiment according to FIG. 3, a frame is provided for the motor vehicle K which is moved in the direction of the arrow at a speed V, which frame is movable on rails 17. The frame consists of the side supports 18 and the beams 4. Two vertical brushes 1 are supported movably on said beams, similarly to the embodiment according to FIG. 1, the carriages of said brushes being connected by a tension spring 19. As soon as the front 20 of the vehicle contacts these two vertical brushes and a contact pressure is achieved which corresponds to the position a or c (FIG. 1), the power meter starts the drive motors 21 of the frame, which drive motors drive the rollers 22. The frame with the brushes 1 is then moved in the direction of the arrow approximately with the speed V of the car K. Simultaneously therewith the brushes 1 are moved in the direction Q outwardly, thus along the front of the vehicle by means of a cable 23. The brushes thus move along the path indicated at d and finally reach with the frame the position indicated at 1'. The transverse movement Q of the brushes by means of the cable 23 can be effected in the illustrated example by guiding said cable over return rollers 24 and winding same onto a reel 25 which is driven by the motor 21. Upon reaching the brush position 1', the driving motor 21 acting here as a positioning member is reversed which motor control can in this case also originate from the power meter. Upon the motor 21 being reversed, the frame returns into the illustrated initial position and simultaneously the longitudinal sides 8 of the vehicle are washed by the brushes 1, said brushes being pressed against the vehicle by the tension spring 3.

FIG. 4 illustrates the washing by means of a horizontal brush 26 of the upper side of a through-passing motor vehicle K moved in the direction of the arrow. This brush is guided in a vertical direction in a stationary frame 27 and can be lifted or lowered by a cable control 28. This cable control is guided over a drive roller 29 and a return roller 30 and there is provided a counterweight 31 for weight balance of the brush 26. The lifting and lowering movement is carried out by a servomotor 32 which receives control orders from a power meter 35 through two relays 33, 34. This power meter is connected both to the circuit of the servomotor 32 and also to the three-phase alternating current lines R, S, T, Mp, as is schematically illustrated. A crossed-coil instrument can be provided as a power meter, the rotor of which crossed-coil instrument and the dial rotor are indicated with dial pointers. This power meter has two adjustable contacts 38, 39 which correspond to the aforementioned minimum demand, or maximum demand, of the brush drive motor 5. The aforementioned brush movement zone B, representing the desired minimum or maximum contact pressure of the brush, can be adjusted by shifting of the contacts 38, 39.

As has already above been discussed, control signals are transmitted from the output meter 35 to the servomotor 32 so that the contact pressure of the brush against the vehicle K remains approximately constant. The brush then assumes the already described contact positions $a$, $b$, $c$ with respect to the vehicle K, as it moves in the direction of the arrow, with respect to the windshield 40. If the contact pressure which corresponds to the position $a$ or $c$ is exceeded, the servomotor 32 is operated by the power meter and effects a lifting movement of the brush with cable control 28. In a similar manner during washing of the rear window glass of the vehicle, the brush 26 is lowered by the servomotor 32.

The vehicle K can run through on a conveyor belt 41 which has catches 42 and is driven by a motor 43. If necessary during washing of the front side 20 of the vehicle and also the rear side, also during washing of the windshield 40 and the rear window, the drive motor 43 and thus the conveyor belt 41 can be stopped so that during lifting or lowering of the brushes 26 the contact pressure remains approximately constant.

The embodiments of the invention in which an exclusive property or privilege is claimed are defined as follows:

1. In a control device for an alternating current motor-driven work brush movable by adjusting means, said work brush being used to clean motor vehicles, said control device controlling the relative movement between the brush and the surfaces which are to be cleaned, which relative movement is required to achieve a desired contact pressure, the improvement comprising:

electrical power measuring means connected in electrical circuit with electrical power supply conductors to said drive motor, said electrical power measuring means being adapted to produce at least one electrical signal when said input power consumed by said drive motor reaches at least one of a predetermined high input power measurement and a predetermined low input power measurement;

switching means operatively connected with said adjusting means and being responsive to said electrical signal produced by said electrical power measuring means to control the direction of movement of said work brush, said switching means effecting a movement of said work brush away from said surfaces to be cleaned upon the measurement of said predetermined high input power and effecting a movement of said work brush toward said surfaces to be cleaned upon the measurement of said predetermined low input power, said input power measurement being independent of sporatic fluctuations in the individual voltage and current values.

2. The improvement according to claim 1, wherein said electrical power measuring means comprises a crossed-coil instrument having a rotor which cooperates with two adjustable contacts defining said high and low predetermined input power limits of the brush drive motor.

* * * * *